E. HOPKINSON.
APPARATUS FOR MANUFACTURING PNEUMATIC TIRES FOR VEHICLES.
APPLICATION FILED MAR. 22, 1918.

1,289,774.

Patented Dec. 31, 1918.
2 SHEETS—SHEET 1.

Inventor
Ernest Hopkinson

E. HOPKINSON.
APPARATUS FOR MANUFACTURING PNEUMATIC TIRES FOR VEHICLES.
APPLICATION FILED MAR. 22, 1918.

1,289,774.

Patented Dec. 31, 1918.
2 SHEETS—SHEET 2.

Inventor
Ernest Hopkinson

UNITED STATES PATENT OFFICE.

ERNEST HOPKINSON, OF NEW YORK, N. Y.

APPARATUS FOR MANUFACTURING PNEUMATIC TIRES FOR VEHICLES.

1,289,774.  Specification of Letters Patent.  Patented Dec. 31, 1918.

Original application filed February 19, 1918, Serial No. 218,027. Divided and this application filed March 22, 1918. Serial No. 232,936.

*To all whom it may concern:*

Be it known that I, ERNEST HOPKINSON, a citizen of the United States, and a resident of New York city, county and State of New York, have invented certain new and useful Improvements in Apparatus for Manufacturing Pneumatic Tires for Vehicles, of which the following is a full, clear, and exact description.

This invention relates more particularly to apparatus for making tire casings wherein is employed fluid pressure applied indirectly to the interior of the casing through the medium of an elastic wall for bringing the casing to substantial tire formation, and wherein is subsequently employed fluid pressure applied directly to the interior for giving complete formation to the casing and for supporting the casing during vulcanization.

This application is a division of my copending application Serial No. 218,027, filed February 19, 1918.

Referring to the drawings forming part of this specification:—

The object of the invention is to provide an apparatus whereby a tire casing built on the usual rigid core may be stretched by an elastic expanding member and vulcanized in such stretched condition without subjecting the expanding member to the action of heat. This has been attempted heretofore but without success, so far as I know.

I accomplish the desired object by stretching the tire casing built on the core by means of fluid pressure exerted through an elastic member, such as a suitably formed rubber sheath or an inner tube, and holding the unvulcanized casing under such pressure until the fiber (woven or cord fabric) and the unvulcanized rubber are set at substantially the desired size. The present invention is confined to apparatus for accomplishing these steps in the method of manufacturing tires as disclosed in my before mentioned copending application, the preferred apparatus being shown in Figs. 1 and 2 of the drawings. For a clearer understanding of the scope of the present invention, the subsequent steps in the manufacture of the tire will also be described in the present application and for this purpose the remaining Figs. 3 and 4 of the drawings are shown in order that the method may be clearly understood and the importance of the apparatus shown in Figs. 1 and 2 fully appreciated. After the tire has been treated as above briefly outlined, the elastic expansible member is then removed, a sealing member placed within the opening and between the edges of the casing, and either placed in a metal mold or a wrapping of canvas applied, fluid under pressure is introduced in the cavity of the casing in direct contact with the inner surface and the tire is vulcanized in such condition.

Figure 2:
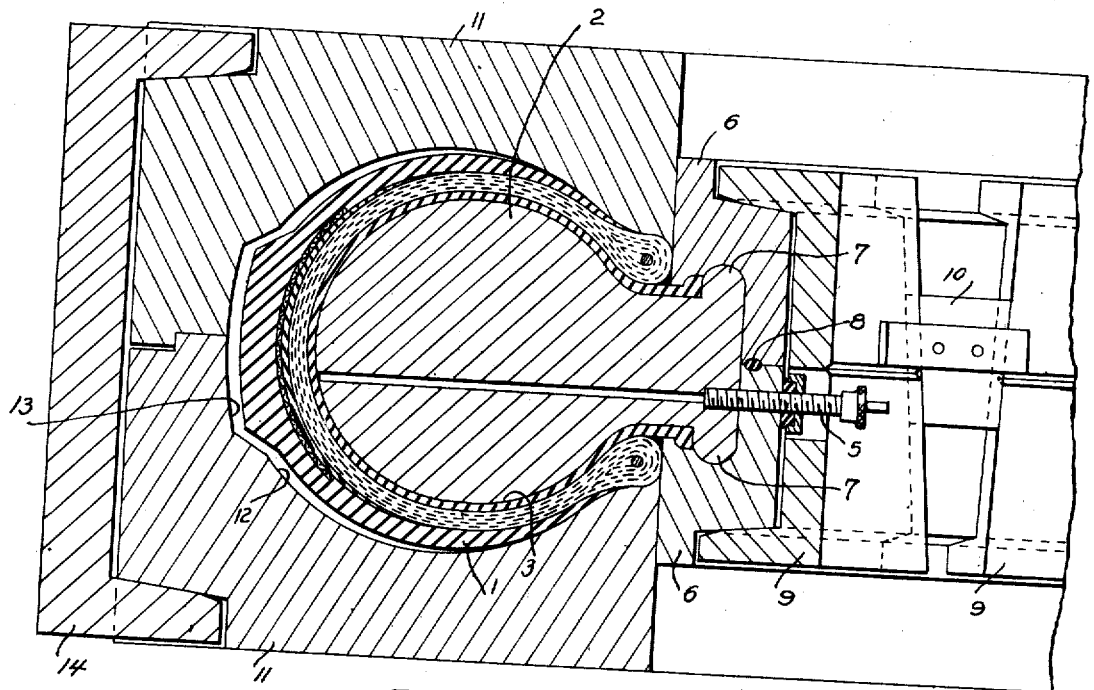
Fig. 2 is a view similar to Fig. 1 but including the outer confining members.
Figure 1:
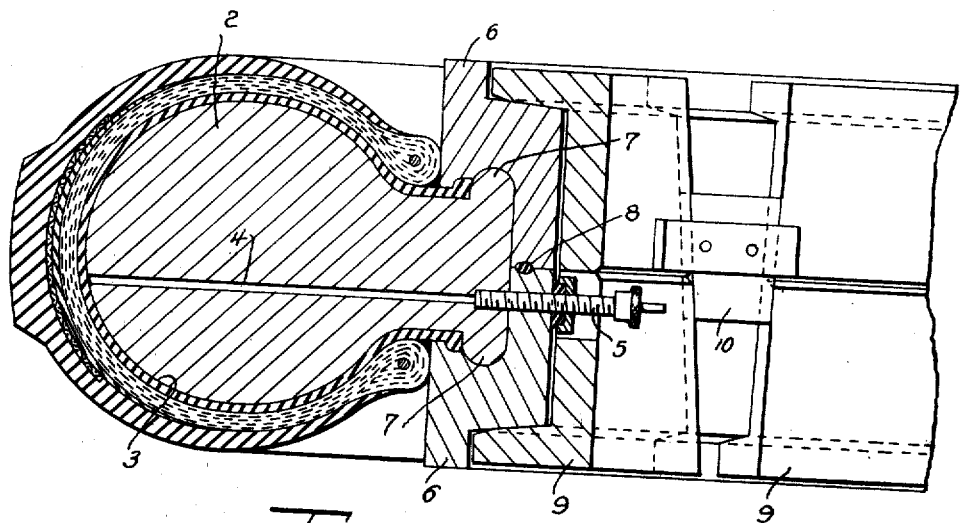
Figure 1 is a transverse sectional view of the core showing a casing built thereon.
Figure 4:
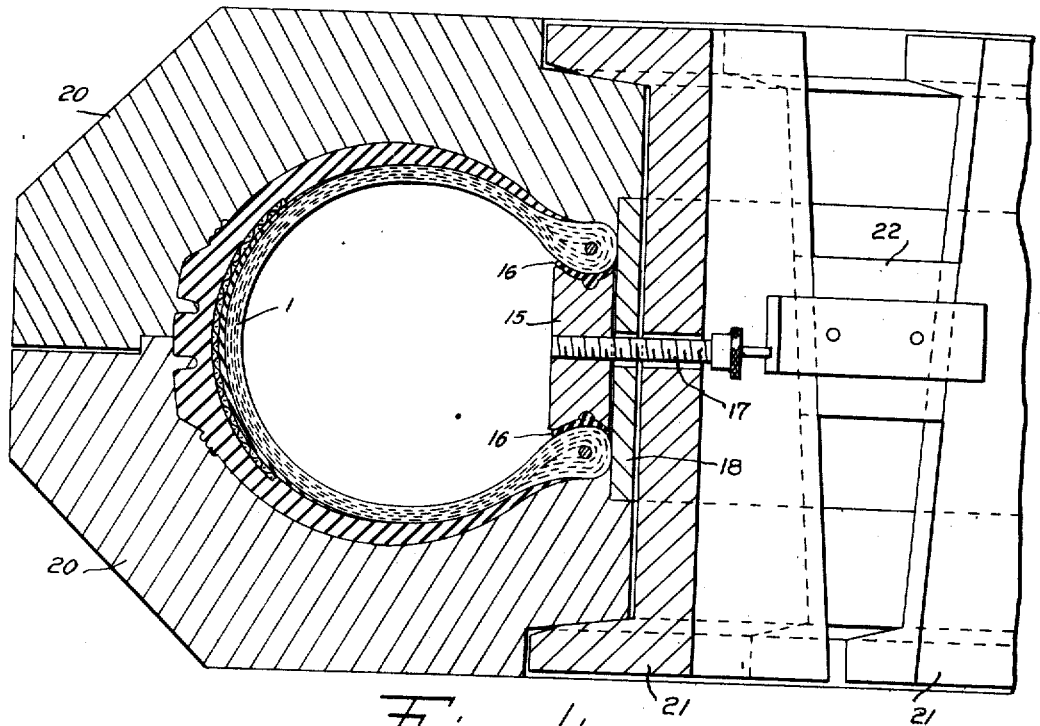
Fig. 4 is a view similar to Fig. 3, but showing the casing in its completed form within the finishing mold members.
Figure 3:
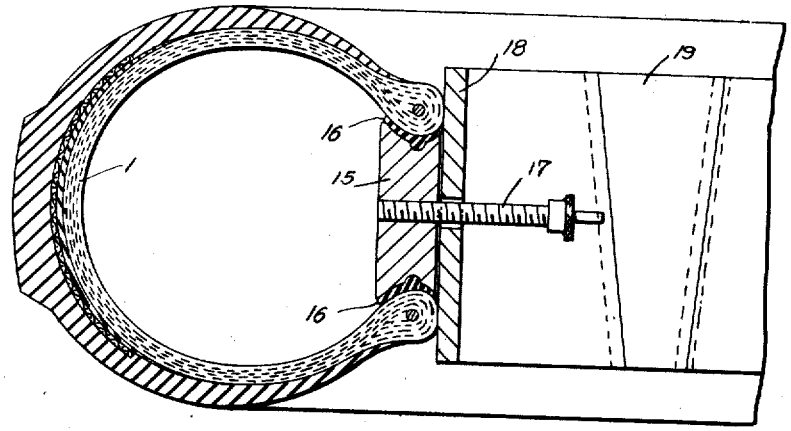
Fig. 3 is a transverse sectional view of a casing and a support therefor after it has been removed from the apparatus shown in Fig. 2.

Referring more particularly to the drawings, Fig. 1 shows the casing built upon the core before any fluid pressure is applied. Fig. 2 shows the casing of Fig. 1 supported on the interior elastic expansible wall within exterior confining members in readiness to be subjected to the action of the fluid pressure and exterior confining members to bring it to substantial tire size and for setting it in this form with an outer surface designed to locate the tread rubber in approximately the quantities desired at the tread and sides in the finished tire. Fig. 3 shows the casing after it has been removed from the apparatus shown in Fig. 2 and supported at its bead portions ready for the final treatment. Fig. 4 shows the casing completely formed within the finishing mold by the direct application of interiorly applied fluid pressure.

The tire casing 1 may be formed of plies of any desired material, such as cords, thread fabric, woven fabric, etc., which are assembled upon a support 2 in any well-known or preferred manner. The support may be of any desired shape, but in my preferred embodiment it is shown similar to the ring core of usual construction and is formed of sections in the usual manner in order that it may be withdrawn from the casing. The support or core is provided with an expansible wall or cover 3 which is preferably formed of vulcanized rubber, and communication is maintained between the surface of the core and expansible rubber wall and the exterior or source of fluid supply by any desired means, as for instance by means of the conduit 4 extending through the support, and the tube 5 tapped into the conduit which may be similar to the usual type of valve used with inner tubes.

The core sections are held together by the oppositely disposed rings 6—6 which are suitably channeled to receive the flanges 7 extending from the inner periphery of the core. The rings are provided at their meeting faces with a sealing ring 8 of lead, rubber or other suitable material for preventing the escape of the fluid when applied to the elastic wall 3.

While I may rely upon the pressure of the tire edges against the rubber wall 3 for producing a sealing thereof with the core, I prefer however to provide the wall with circumferential beads and to extend it between the core and rings 6. The rings will thereby serve to seal the interior of the wall 3 from the exterior and will also provide means for anchoring the wall to prevent any undesirable movement thereof during the building of the casing thereon, or during the subsequent expanding action produced by the fluid pressure.

The rings 6 are preferably held together by means of clamps 9 which are provided with flanges to engage recesses formed in the members 6 and are arc-shape transversely to form when assembled, a circumference within the circumference of the rings 6, which is broken by a V-shaped space into which is inserted a wedge-shaped locking member 10.

The outer confining members may be of any desired form, in the present instance, I have shown them formed of two sections 11—11 which have walls 12 for engaging the casing, which are substantially the size of the finished tire, but only roughly conforming to its outer surface, and are provided with depressions, such as the depressions 13, for effecting a blocking out of the exterior rubber wall of the casing to properly locate the rubber for the final vulcanizing operation. The confining members may be secured together in any desired manner, but I prefer to use the clamps 14, similar to the clamps 9, as they form a ready and easy means for securing the members together. The inner circumference of the confining members preferably engages the outer circumference of the rings 6, as shown in Fig. 2, to form a complete inclosure for the casing.

When the parts are in the position shown in Fig. 2 fluid under pressure is admitted through the passage 4 opening underneath the rubber cover 3 thus lifting the same away from the core surface and expanding the casing and pressing it against the inner surface of the outer confining members in which condition the casing is held until it is substantially set. If I use air the casing will preferably be kept within the outer confining means during the whole setting period, but if I use water it will only be necessary to admit the water under high pressure to cause the casing to be firmly pressed against the outer confining members and then close the passage to the source of fluid pressure thus locking in the contained water which then will be practically a solid core of the exact size to which it is desired to set the casing. The outer confining members may be then removed and the casing left to stand on the core and locking parts until set.

In the further carrying out of my invention, and after the casing has been removed from the apparatus to which the present application is directed and which is illustrated in its preferred embodiment in Figs. 1 and 2, it is mounted on a ring 15 provided with the sealing faces 16 formed preferably of unvulcanized rubber, and the tube 17 for admitting the fluid to the interior of the casing which may be similar to the usual type of valve used with inner tubes. The ring is supported on an expansible rim 18 having a wedge-shaped gap provided with V-shaped walls for receiving a wedge-shaped key 19 having correspondingly V-shaped walls for engaging the walls of the ring. The key will operate in an obvious manner to expand the rim to cause it to have a loose fit under the ring 15 and to compress the edges of the casing to give them the exact diameter desired in the finished tire. The confining mold members 20 are then placed about the casing as thus supported and are secured together by the clamps 21 which are held in place by the key 22, this locking means being similar to that shown in Fig. 2.

In subjecting the casing to the action of fluid pressure applied through the medium of the elastic expansible wall, I may employ any fluid, such as for example air or water, but in applying the fluid direct to the casing, I employ a fluid that will have no deleterious effect upon the rubber, and I have found that satisfactory results may be attained by employing carbon-dioxid, although steam or such gases as ammonia, nitrogen and the like may be used if desired.

In the preferred embodiment of my invention for shaping and setting the casing as a step preliminary to giving complete formation and vulcanization, I provide a wall that will readily stretch when the fluid pressure is applied and will afterward automatically return to its normal position when the casing has been formed and set and the expanding pressure released. This permits of the repeated use of the wall and renders it a permanent feature of the apparatus, whereas if it were only capable of expansion, it would have to be discarded and a new one substituted for each casing manufactured, thereby materially increasing the cost of the tire.

I have found that a wall made of vulcanized rubber may be used for this purpose for it will readily expand within the required limits and will automatically return to its normal position when the fluid is removed, thereby providing a wall that forms a permanent part of the apparatus and capable of repeated use for an almost indefinite period. Vulcanized rubber compound is especially suited for forming the wall as the apparatus is for use only in shaping and setting the casing and is never subjected to a temperature that would injuriously affect it, as would be the case if the casing were subjected to the vulcanizing heat while supported by the rubber wall. Furthermore, it is desirable that the exterior surface upon which the casing is built be as smooth as possible, and I have found that the rubber wall possesses the desired degree of smoothness for this purpose. Moreover, the wall when composed of rubber may be made somewhat smaller than the core and then stretched over the core thereby increasing the smooth continuity of surface desired. It may be made of sufficient thickness and suitably compounded to provide the necessary elasticity within the required limits and at the same time present sufficient rigidity to form a base upon which to build the casing. The rubber wall being perfectly elastic and yielding will readily permit the sections of the core to be removed from within it when the casing has been formed and set, and will likewise permit the sections to be readily assembled within it in making ready for the next casing, or if desired, the sections may be first assembled and then the rubber covering stretched over the core.

Moreover it is highly desirable that the sections of the core be accurately alined with each other so that there will be no irregularity at the joints which would tend to impart a corresponding irregularity in the surface of the rubber covering. To therefore insure a positive alinement of the sections, and to prevent any possible radial movement thereof, I prefer to have the rings 6—6 directly engage the sections as shown in Fig. 2, and I therefore provide only a comparatively narrow margin of the rubber covering 3 for engagement by the rings instead of extending it entirely around the core which would prevent the desired direct contact of the core and rings. The rubber covering is preferably provided with the circumferential beads as shown to insure an air-tight jointure between the core and rings and to resist the outward pull when the fluid is applied. This manner of securing the wall, while it seals the rings 6 to the wall thereby preventing any escape of fluid that might pass out through the core sections from reaching the exterior, does not provide a seal between the engaged faces of the rings and to prevent a leakage at this point, I provide the sealing ring 8, thereby insuring a fluid-tight chamber between the core and rubber covering.

As many apparently widely different embodiments of this invention may be made without departing from the spirit thereof, it is to be understood that I do not intend to limit myself to the specific form of embodiment of the invention herein described.

Having thus described my invention what I claim and desire to protect by Letters Patent is:—

1. Apparatus for use in shaping and setting pneumatic tire casings which comprises a rigid core, a rubber wall covering the core for building a tire casing upon, and means for introducing fluid between the core and wall.

2. Apparatus for use in shaping and setting pneumatic tire casings which comprises a rigid core formed in sections, a rubber wall covering the core for building a tire casing upon, means for holding the sections together, and means for introducing fluid between the core and wall.

3. Apparatus for use in shaping and setting pneumatic tire casings which comprises a rigid core, a detachable rubber wall covering the core for building a tire casing upon, means for sealing the wall to the core, and means for introducing fluid between the core and wall.

4. Apparatus for use in shaping and setting pneumatic tire casings which comprises a rigid core formed in sections, means for sealing the sections from the exterior, a rubber wall covering the core for building a tire casing upon, and means for introducing fluid between the core and wall.

5. Apparatus for use in shaping and setting pneumatic tire casings which comprises a rigid core formed in sections, means formed in sections for securing the sections of the core together, means for securing said means together, a rubber wall covering the core for building a tire casing upon, and means for introducing fluid between the core and wall.

6. Apparatus for use in shaping and setting pneumatic tire casings which comprises a rigid core formed in sections, a rubber wall covering the core for building a tire casing upon, means for securing the sections of the core together and for sealing the wall to the core, and means for introducing fluid between the core and wall.

7. Apparatus for use in shaping and setting pneumatic tire casings which comprises a rigid core, a rubber wall covering the core for building a tire casing upon, exterior confining means for the casing, and means for introducing fluid between the core and wall.

8. Apparatus for use in shaping and setting pneumatic tire casings which comprises a rigid core, an expansible wall covering the core for building a tire casing upon, exterior confining means having an inner wall roughly conforming to the final configuration of the outer surface of the finished tire, and comprising depressed portions to roughly block out the rubber stock corresponding to the final configurations produced in the finished article, and means for introducing fluid between the core and wall.

9. Apparatus for use in shaping and setting pneumatic tire casings which comprises a rigid core, a rubber wall covering the core for building a tire casing upon, exterior confining means formed in sections, and means for introducing fluid between the core and wall.

10. Apparatus for use in shaping and setting pneumatic tire casings which comprises a rigid core, a rubber wall covering the core for building a tire casing upon, exterior confining means formed in sections, means for securing the sections together, and means for introducing fluid between the core and wall.

11. Apparatus for use in shaping and setting pneumatic tire casings which comprises a rigid core, a wall covering the core freely expansible under the influence of fluid pressure and automatically returnable to normal position when the pressure is removed, and means for introducing fluid between the core and wall.

12. Apparatus for use in shaping and setting pneumatic tire casings which comprises a rigid core formed in sections, a rubber wall covering the core for building a tire casing upon, means for holding the sections against outward movement, and means for introducing fluid between the core and wall.

13. Apparatus for use in shaping and setting pneumatic tire casings which comprises a rigid core formed in sections, a rubber wall covering the core for building a tire casing upon, means sealing the wall to the core and for directly engaging the sections to hold them in alinement and against outward movement, and means for introducing fluid between the core and wall.

14. Apparatus for use in shaping and setting pneumatic tire casings which comprises a rigid core formed in sections, rings in direct contact with the core for securing the sections thereof together, means for sealing the rings together, a rubber wall covering the core for building a tire casing upon, and means for introducing fluid between the core and wall.

15. Apparatus for use in shaping and setting pneumatic tire casings which comprises a rigid core formed in sections for building a tire casing upon, rings in direct contact with the core for securing the sections thereof together, said rings having inwardly extending lateral portions, means for sealing the rings together along engaging walls of said portions, means for sealing the rings to the sections of the core, and means for introducing fluid between the core and casing.

16. Apparatus for use in shaping and setting pneumatic tire casings which comprises a rigid core formed in sections, a rubber wall covering the core for building a tire casing upon, rings in direct contact with said core for securing the sections thereof together and for sealing the wall to the core, means for sealing the rings together, and means for introducing fluid between the core and wall.

17. Apparatus for use in shaping and setting pneumatic tire casings which comprises a rigid core formed in sections for building a tire casing upon, rings in direct contact with the core for securing the sections thereof against lateral and outward radial movement, said rings having inwardly extending lateral portions, means for sealing the rings together along engaging walls of said portions, means for sealing the rings to the core, and means for introducing fluid between the core and casing.

18. Apparatus for use in shaping and setting pneumatic tire casings which comprises a rigid core formed in sections for supporting a tire upon and having a portion projecting inwardly beyond the tire supporting portion, means directly engaging oppositely disposed faces of the inwardly projecting portion, said means being provided with inwardly extending portions extending laterally beyond the inner circumference of said sections, means for introducing fluid between the core and casing, and means for sealing the core to prevent the fluid from escaping between the adjacent walls of the sections.

19. Apparatus for use in shaping and setting pneumatic tire casings which comprises a rigid core formed in sections for building and supporting a tire upon and having a portion projecting inwardly beyond the tire supporting portion, means holding the sections together having a portion directly engaging the inwardly projecting portion of the core, said holding means being disposed entirely inwardly beyond the tire supporting portion to leave said portion entirely unobstructed to permit said holding means to function while the tire is being built upon the core, means for introducing fluid between the core and casing, and means for sealing the core to prevent the fluid from escaping between the adjacent walls of the sections.

Signed at New York, New York, this 14th day of March, 1918.

ERNEST HOPKINSON.

Correction in Letters Patent No. 1,289,774.

It is hereby certified that in Letters Patent No. 1,289,774, granted December 31, 1918, upon the application of Ernest Hopkinson, of New York, N. Y., for an improvement in "Apparatus for Manufacturing Pneumatic Tires for Vehicles," an error appears in the printed specification requiring correction as follows: In the heading to the specification, line 6, for "Serial No. 232,936" read *Serial No. 223,936;* and that the said Letters Patent should be read with this correction therein that the same may conform to the record of the case in the Patent Office.

Signed and sealed this 21st day of October, A. D., 1919.

[SEAL.]

M. H. COULSTON,

*Acting Commissioner of Patents.*

Cl. 18—17.